United States Patent
Nakano

(10) Patent No.: US 8,218,176 B2
(45) Date of Patent: Jul. 10, 2012

(54) COMMUNICATION DEVICE HAVING TIMER-TRANSMISSION FUNCTION

(75) Inventor: Keiichi Nakano, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1129 days.

(21) Appl. No.: 11/892,895

(22) Filed: Aug. 28, 2007

(65) Prior Publication Data

US 2008/0055664 A1    Mar. 6, 2008

(30) Foreign Application Priority Data

Aug. 29, 2006    (JP) .................................. 2006-232512

(51) Int. Cl.
G06F 3/12    (2006.01)

(52) U.S. Cl. ...... 358/1.15; 358/1.16; 358/1.1; 358/1.13; 717/168

(58) Field of Classification Search ................. 358/1.15, 358/1.14, 400, 440; 717/168; 455/410
See application file for complete search history.

(56) References Cited

U.S. PATENT DOCUMENTS

| | | | | |
|---|---|---|---|---|
| 6,963,427 | B1* | 11/2005 | Tanimoto | 358/400 |
| 2002/0010854 | A1* | 1/2002 | Ogura et al. | 713/100 |
| 2002/0048051 | A1* | 4/2002 | Momonami et al. | 358/440 |
| 2004/0203591 | A1* | 10/2004 | Lee | 455/410 |
| 2006/0238794 | A1* | 10/2006 | Hada | 358/1.13 |

FOREIGN PATENT DOCUMENTS

| | | |
|---|---|---|
| JP | A 2004-241953 | 8/2004 |
| JP | B2 3557878 | 8/2004 |

OTHER PUBLICATIONS

Sato et al., Facsimile Equipment Having Dial Number Register Function, Jun. 2, 1999, JP 11150614.*

* cited by examiner

*Primary Examiner* — Benny Q Tieu
*Assistant Examiner* — Martin Mushambo
(74) *Attorney, Agent, or Firm* — Oliff & Berridge, PLC

(57) ABSTRACT

A communication device is configured to transmit subject data to be transmitted. A desired destination is designated by designating a desired abbreviated number contained in a facsimile number list which contains abbreviated numbers and respectively corresponding facsimile numbers. A predetermined operation is applied to a facsimile number corresponding to the desired abbreviated number to obtain a first operated value. Then, the desired abbreviated number and the first operated value are stored. The predetermined operation is applied again to a facsimile number corresponding to the desired abbreviated number as stored to obtain a second operated value after the transmission instruction is acquired. Whether the second operated value coincides with the second operated value is judged, and transmission of the subject data is aborted if the first operated value does not coincide with the second operated value.

20 Claims, 6 Drawing Sheets

| ABBREVIATED NUMBER | DESTINATION | FACSIMILE NUMBER | MODE |
|---|---|---|---|
| 001 | ABC CORPORATION | 052-1234-5678 | G3 |
| 002 | BCD CORPORATION | 052-2345-6789 | G3 |
| ⋮ | ⋮ | ⋮ | ⋮ |
| 009 | CDE CORPORATION | 052-3456-7890 | G4 |
| ⋮ | ⋮ | ⋮ | ⋮ |
| 021 | HOKKAIDO OFFICE | 0166-5656-1234 | G4 |
| 022 | TOKYO OFFICE | 03-1212-9876 | G3 |
| 023 | NAGOYA OFFICE | 052-5566-8856 | G3 |
| ⋮ | ⋮ | ⋮ | ⋮ |
| 027 | OSAKA OFFICE | 06-876-5623 | G4 |
| 028 | KYUSHU OFFICE | 099-2312-8864 | G3 |
| 029 | OKINAWA OFFICE | 098-2365-6956 | G3 |
| ⋮ | ⋮ | ⋮ | ⋮ |
| 031 | OVERSEAS A | 001-1-3344-5566 | G3 |
| 032 | OVERSEAS B | 001-2-5678-6598 | G3 |

FIG.3A

| GROUP NUMBER | GROUP NAME | ABBREVIATED NUMBER |
|---|---|---|
| #01 | INTERNAL HOKURIKU OFFICE | 081 082 083 |
| #02 | INTERNAL TOKAI OFFICE | 084 085 086 |
| ⋮ | ⋮ | ⋮ |
| #07 | SHIKOKU FACTORY | 051 052 053 |

FIG.3B

TRANSMISSION ABORTED
DUE TO CHANGE OF FACSIMILE NUMBER

ABBREVIATED NUMBER:03

FIG. 4

TIMER-TRANSMISSION RERORT

TIME :    2007/01/01  20:21
SER.#:   G01122334455

DATE                          01/01 20:21
ABBREVIATED NUMBER            003
DURATION OF COMMUNICATION     00:00:00
NUMBER OF PAGES
RESULT                        NOT TX DUE TO CHANGE OF FACSIMILE NUMBER
IMAGE QUALITY                 NORMAL

FIG. 5

COMMUNICATION DEVICE HAVING TIMER-TRANSMISSION FUNCTION

CROSS-REFERENCE TO RELATED APPLICATIONS

This application claims priority from Japanese Patent Applications No. 2006-212512 filed on Aug. 29, 2006. The entire disclosure of the prior application is incorporated herein by reference.

BACKGROUND

1. Technical Field

The present invention relates to a communication device having a timer transmission function for programming the communication device to transmit information to a preset destination at a preset time.

2. Related Art

Generally, a facsimile device employs an abbreviated dialing function. That is, the facsimile device is provided with a facsimile number list (e.g., telephone book) containing a list of destinations and corresponding facsimile numbers in relation with abbreviated numbers, respectively. A user can input a facsimile number of a destination by inputting the abbreviated number corresponding to the destination. Further, a facsimile device generally employs a programming function for designating a time at which a transmission will be performed. Hereinafter, such a programming function will be referred to as a timer-transmission function or programmed transmission function.

With the above functions, the user can program the facsimile device to transmit a document to a desired destination at a desired time by designating an abbreviated number of the desired destination and a desired transmission time.

Even if the timer-transmission function is not used, if an attempt to transmit a document is failed as a facsimile device at the destination is busy, another attempt will generally be executed. In such a case, although the user does not intend to designate a time, the facsimile device automatically sets a time at which the next attempt for transmission is performed. Therefore, the timer-transmission function is used.

Incidentally, when a document is transmitted to a plurality of destinations (i.e., a multicast transmission), the facsimile device attempts to send the facsimile to the destinations one after another. Therefore, to destinations at a later portion of a queue, the attempt to send the facsimile is performed after a certain period has passed after the multicast transmission was started.

In the above cases, since there exists a certain period between the operation of the user to designate the destination (s) using the abbreviated numbers and the attempt to send the facsimile, there would be a case where the facsimile number list is modified. That is, a facsimile number corresponding to the designated abbreviated number may be changed during the certain period. In such a case, when the facsimile device attempts to make a call to a facsimile number corresponding to the designated abbreviated number, the call may not be made to the originally desired destination due to the change of the facsimile number corresponding to the designated abbreviated number.

Generally, facsimile numbers for destination facsimile stations may have relatively many digits of numbers, and in particular, if the multicast transmission is to be done, a lot of facsimile numbers should be input and stored. If the facsimile numbers are stored as they are, a relatively large capacity of storage for the facsimile numbers is required. To avoid this problem, generally, the facsimile device stores the abbreviated numbers instead of the facsimile numbers themselves.

In Japanese Patent No. 3557878 (hereinafter, referred to as '878 patent), a facsimile device configured to deal with the change of the facsimile number corresponding to the abbreviated number that is used for programmed transmission is described. According to '878 patent, when the facsimile number corresponding to the abbreviated number in the telephone book has been changed, whether the abbreviated number is used for the programmed transmission is detected, and a warning message indicating the abbreviated number is being used for the programmed transmission is notified.

In Japanese Patent Provisional Publication No. P2004-241953A (hereinafter, referred to as '953 publication), a server device is disclosed, which checks a process immediately before executing the process, and allows a user to change or cancel the process when necessary.

According to '878 patent, if the facsimile device is configured such that the facsimile numbers corresponding to the abbreviated numbers can be changed or deleted with a computer connected to the facsimile device via a network, or with a cordless handset capable of accessing the facsimile device by a wireless communication, a notification that the designated abbreviated number is being used for the programmed transmission to all the devices connectable to the facsimile device. To design a program for executing such a function is relatively troublesome and difficult.

According to '953 publication, the user is required to instruct the server device whether such a confirmation of the process is to be done, and further, even if the user can check the facsimile number corresponding to the abbreviated number, it may be difficult for the user to determined whether the facsimile number corresponding to the abbreviated number has been changed.

SUMMARY OF THE INVENTION

The present invention is advantageous in that an improved communication device is provided, which employs the abbreviated number system and transmission of data to a wrong destination when the programmed transmission is performed is prevented.

According to aspects of the invention, there is provided a communication device capable of transmitting subject data to be transmitted. The communication device includes a facsimile number list storage configured to store a facsimile number list containing abbreviated numbers and respectively corresponding facsimile numbers, and a destination designating unit configured to designate a desired destination by designating a desired abbreviated number stored in the facsimile number list storage. Further provided is a first operating unit which is configured to apply a predetermined operation to a facsimile number corresponding to the desired abbreviated number to obtain a first operated value. There is provided a designated transmission storage configured to store the desired abbreviated number and the first operated value, and a transmission instruction unit that instructs the communication device to start transmitting the subject data. A second operating unit is configured to apply the predetermined operation to a facsimile number corresponding to the desired abbreviated number stored in the designated transmission storage to obtain a second operated value after the transmission instruction unit instructs to start transmitting the subject data. Further, there is provided a judging unit configured to judge whether the second operated value coincides with the second operated value, and a controlling unit that controls the communication device to abort transmission of the subject data if the judging unit judges that the first operated value does not coincide with the second operated value.

With the above configuration, if the facsimile number has been changed after the destination is designated and before the transmission instruction unit instructs to start the transmission of the subject data, the first operated value does not coincide with the second operated value. Therefore, the controlling unit can abort such transmission, the data will not be transmitted to unintended recipient due to change of the facsimile number corresponding to the designated abbreviated number.

The communication device as above my further include a group destination list storage configured to store a group destination list containing group numbers and a plurality of abbreviated numbers corresponding to each of the group numbers. The destination designating unit is configured to designate a desired group number from among the group numbers stored in the group destination list storage. The first operating unit may apply the predetermined operation to each of the facsimile numbers corresponding to the abbreviated numbers that corresponds to the desired group number to obtain the first operated numbers respectively corresponding to the abbreviated numbers that correspond to the desired group number. The designated transmission storage is configured to store the desired group number and the first operated numbers respectively corresponding to the abbreviated numbers that correspond to the desired group number. The second operating unit may apply the predetermined operation to each of the facsimile numbers corresponding to the abbreviated numbers that corresponds to the desired group number stored in the designate transmission storage to obtain the second operated numbers respectively corresponding to the abbreviated numbers that correspond to the desired group number after the transmission instruction unit instructs to start transmitting the subject data. The judging unit is configured to judge whether each of the second operated numbers coincides with one of the first operated numbers, and the controlling unit controls the communication device to transmit the subject data to the facsimile numbers corresponding to the abbreviated numbers of which the first operated values coincide with the second operated values, respectively, while the controlling unit controls the communication device to abort transmission of the subject data to the facsimile numbers corresponding to the abbreviated numbers of which the first operated values do not coincide with the second operated values, respectively.

With the above configuration, if the facsimile number corresponding to one of the abbreviated numbers including a desired group has been changed after the desired group is designated as a destinations and before the transmission instruction unit instructs to start the transmission of the subject data, one of the second operated value does not coincide with the corresponding second operated value. Therefore, the controlling unit can abort such transmission corresponding to the changed facsimile number, and the data will not be transmitted to unintended recipient due to change of the facsimile number corresponding to the designated abbreviated number.

According to another aspect, there is provides a method of transmitting subject data to be transmitted for a communication device. The method includes the steps of designating a desired destination by designating a desired abbreviated number contained in a facsimile number list containing abbreviated numbers and respectively corresponding facsimile numbers, first applying a predetermined operation to a facsimile number corresponding to the desired abbreviated number to obtain a first operated value, storing the desired abbreviated number and the first operated value, acquiring a transmission instruction to start transmitting the subject data, second apply the predetermined operation to a facsimile number corresponding to the desired abbreviated number stored in the storing step to obtain a second operated value after the transmission instruction is acquired, judging whether the second operated value coincides with the second operated value, and aborting transmission of the subject data if the first operated value does not coincide with the second operated value.

Optionally, the destination designating step designates a desired group number from among the group numbers stored in the group destination list containing group numbers and a plurality of abbreviated numbers corresponding to each of the group numbers. The first applying step applies the predetermined operation to each of the facsimile numbers corresponding to the abbreviated numbers that corresponds to the desired group number to obtain the first operated numbers respectively corresponding to the abbreviated numbers that correspond to the desired group number. The storing step stores the desired group number and the first operated numbers respectively corresponding to the abbreviated numbers that correspond to the desired group number. The second applying step may apply the predetermined operation to each of the facsimile numbers corresponding to the abbreviated numbers that corresponds to the desired group number stored in the storing step to obtain the second operated numbers respectively corresponding to the abbreviated numbers that correspond to the desired group number after the acquiring step acquires the instruction to start transmitting the subject data. The judging step judges whether each of the second operated numbers coincides with one of the first operated numbers, and the controlling step controls the communication device to transmit the subject data to the facsimile numbers corresponding to the abbreviated numbers of which the first operated values coincide with the second operated values, respectively, while the controlling step controls the communication device to abort transmission of the subject data to the facsimile numbers corresponding to the abbreviated numbers of which the first operated values do not coincide with the second operated values, respectively.

It should be noted that the above-described method may be executed by a computer when appropriate programs corresponding to the methods are provided. Such programs may be stored in a computer readable recording medium, and delivered.

BRIEF DESCRIPTION OF THE ACCOMPANYING DRAWINGS

FIG. 3A shows a configuration of a facsimile number list, and FIG. 3B shows an exemplary configuration of a group destination list employed in the MFP shown in FIG. 1.

FIG. 4 is an example of an indication when a programmed transmission is aborted.

FIG. 5 is an exemplary report when the programmed transmission is aborted.

DETAILED DESCRIPTION OF THE EMBODIMENTS

Referring to the accompanying drawings, a communication device according to the invention will be described.

Figure 1:
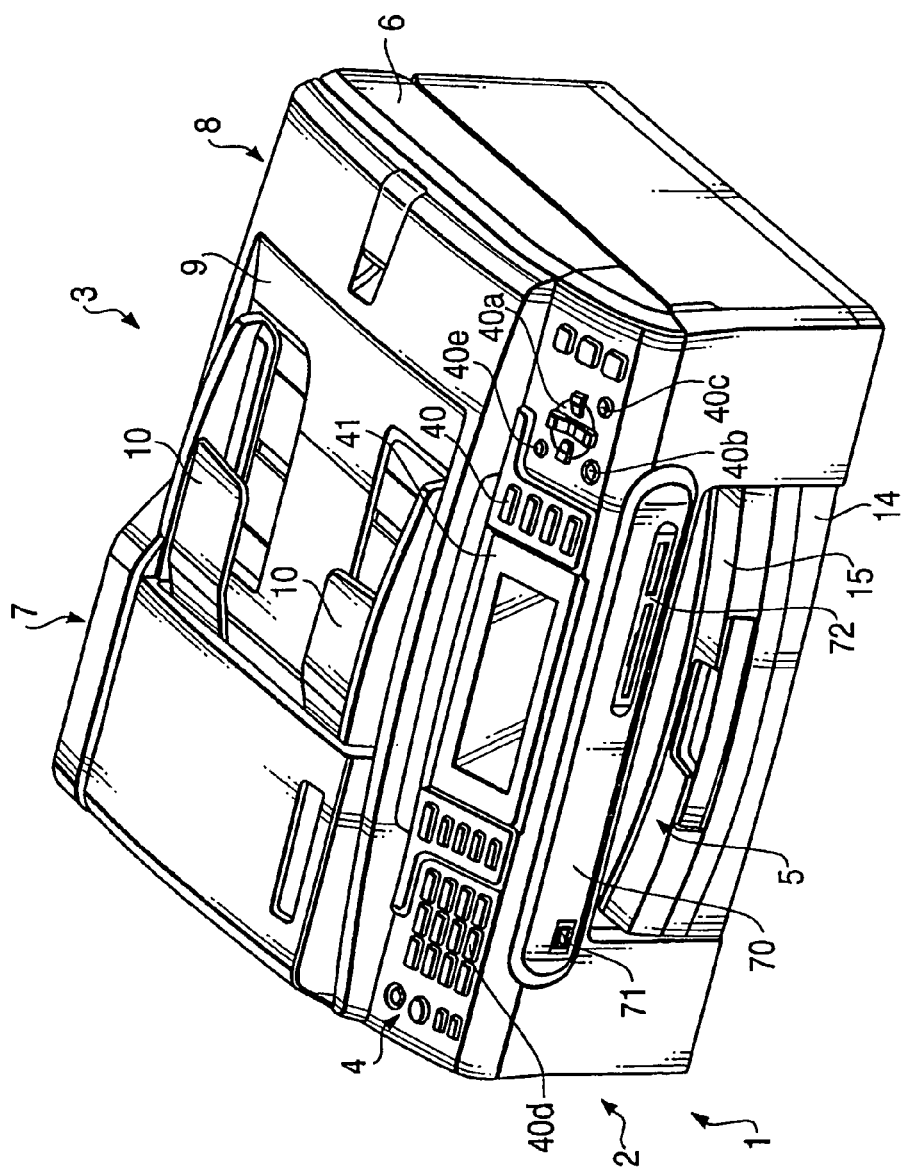
FIG. 1 is a perspective view of an MFP (Multi Function Peripheral) including a function of a communication device, according an embodiment of the invention.

FIG. 1 is a perspective view of an MFP (Multi Function Peripheral) 1 according to an embodiment of the invention. The MFP 1 includes integrally assembled printer section 2 provided at a lower part of the MFP 1, scanner section 3 provided at an upper portion of the MFP 1 (i.e., above the printer section 2), and operation panel 4 provided on a front side of the scanner section 3. The MFP 1 has functions of printer, scanner, copier and facsimile device.

Figure 2:
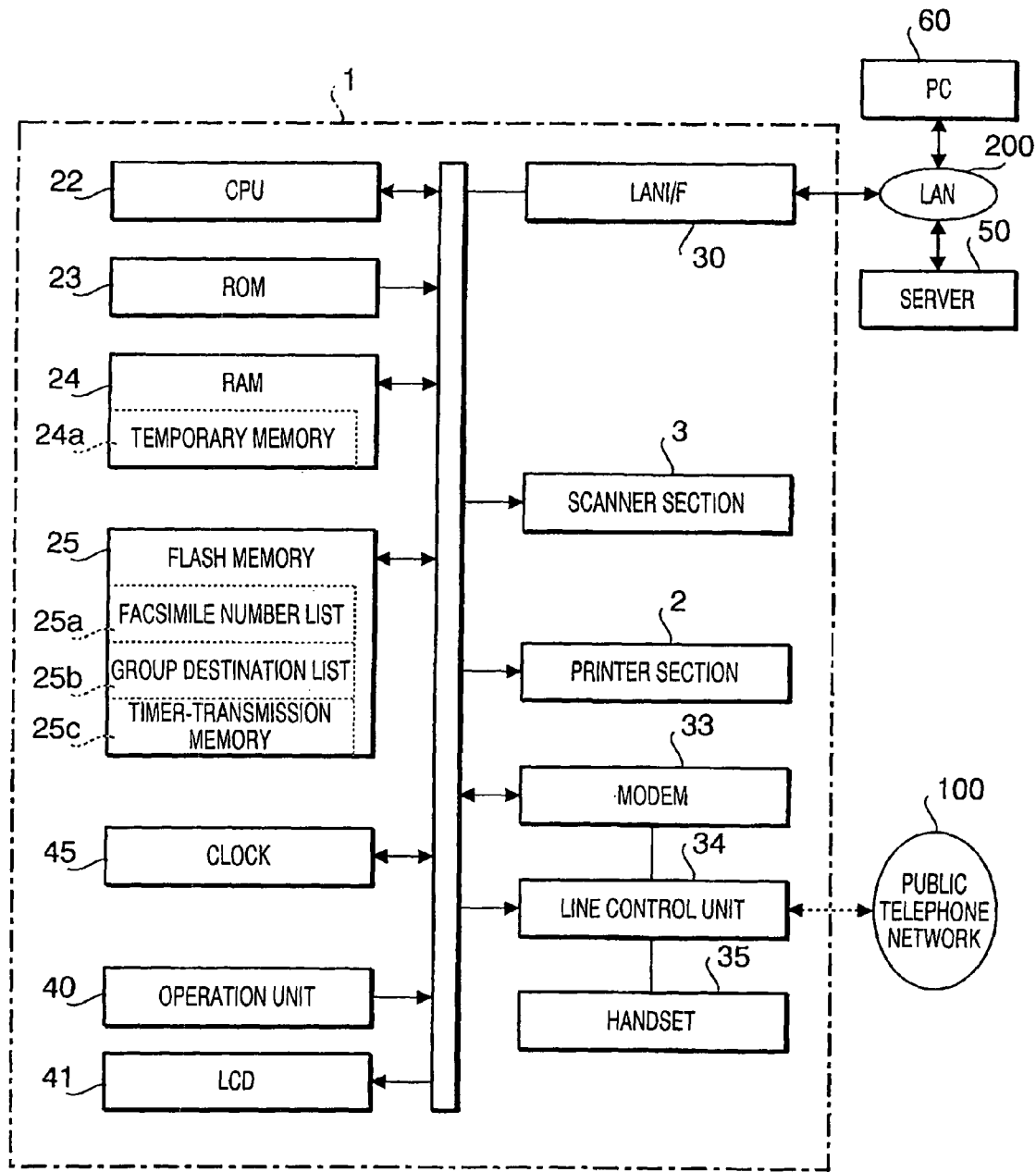
FIG. 2 is a block diagram illustrating an electronic configuration of the MFP shown in FIG. 1.

FIG. 2 is a block diagram showing an electrical configuration of the MFP 1. As shown in FIG. 2, the MFP 1 is connected with external devices, such as a server 50 and a computer 60 via a LAN (Local Area Network) 200, and capable of printing out images/documents on a printing sheet based on image data/document data received from the external devices. To the MFP 1, other external devices such as a digital camera, and recording medium such as a memory card can be locally connected. Thus, the MFP 1 can print out the image data and the like retrieved from the locally connected devices on the printing sheet. The printing sheet may be of various types, including paper, transparent sheet for OHP (Over Head Projector), and fabric.

The scanner section 3 is configured as an FBS (Flatbed Scanner) having an original scanning table 6, and a cover 8 implemented with an ADF (Auto Document Feeder) 7. The cover 8 is secured to a main body of the MFP 1 with hinges so that it can be opened/closed with respect to the original scanning table 6.

The upper surface of the scanning table 6 is configured such that a platen glass is fitted in an opening formed thereat. Inside the scanning table 6 (i.e., below the scanning table 6), a space for accommodating an image scanning unit, a driving mechanism therefore, and for allowing the image scanning unit to move is provided.

The ADF 7 is configured to feed an original sheet from an original tray 9 to a discharge tray 10 via an original sheet feed path. The printer section 2 is provided with an inkjet printer, which can print out images based on image data scanned and generated by the scanning unit 3 and/or received from external devices.

On a front surface of the MFP 1 (printer 2), an opening 5 is formed. Inside the opening 5, a sheet feed tray 14 and a sheet discharge tray 15 are provided. The sheet feed tray 14 and the sheet discharge tray 15 are completely accommodated in side the MFP 1 and do not project from the opening 5. The sheet feed tray 14 is located above the sheet discharge tray 15, as shown in FIG. 1.

The operation panel 4 is formed to fit in a space defined between an upper front portion of the printer section 2 and a front portion of the scanner section 3. The operation panel 4 is used for operating the printer section 2 and the scanner section 3. The operation panel 4 is provided with an operation unit 40 including a plurality of operable keys and an LCD (Liquid Crystal Display) 41. The LCD 41 is configured to have two screens each having an aspect ratio of 3:4 next to each other, thereby providing a display screen having an aspect ratio of 3:8.

A user can input desired commands using the operation panel 4. When the user inputs a command to the MFP 1, based on the input command, a CPU 22 (see FIG. 2) controls the operation of the MFP 1. The operation unit 40 includes a cross key (arrow key) 40a for selectively designating up, down, right and left directions, an enter key 40b for commanding execution of a designated operation, a stop key 40c for terminating an operation, ten keys 40d, which are provided on a left-hand side of the LCD 41 in FIG. 1, for inputting numerals, and a deletion key 40e for commanding deletion of data. Further, the MFP 1 is provided with a clock 45 which measures a current time. The clock 45 is used for a timer-transmission function (described later) is used.

The MFP 1 is also configured to operate in accordance with commands transmitted from a computer connected to the MFP 1. Specifically, such commands are transmitted via printer driver, scanner driver and the like.

Above an opening 5 of the printer 2, a connection panel 70 is provided. The connection panel 70 is formed with a USB terminal 71 on a left-hand side thereof in FIG. 1. Through the USB terminal 71, an external device having a USB interface can be connected to the MFP 1. On right-hand side of the connection panel 70, a slot portion 72 is formed. The slot portion 72 has a plurality of card slots in which various types of memory cards can be inserted, respectively.

If a card memory is inserted to one of the card slots, and the CPU 22 retrieves image data stored in the card slot, images/information corresponding to the retrieved image data is displayed on the LCD 41 and/or printed by the printer section 2.

Further, as shown in FIG. 2, the MFP 1 includes a microcomputer containing the CPU, ROM (Read Only Memory) 23, RAM (Random Access Memory) 24 and flash memory 25, which are connected to the operation unit 40, the LDC 41, a LAN I/F (interface) 30, the scanner section 3, the printer section 2, a modem 33 and a line controller 34. To the line controller 34, a handset 35 is connected, with which a voice communication (normal telephone communication) can be done.

The ROM 23 stores various control programs, to be executed by the CPU 22, for controlling the facsimile, copier and scanner functions, and various parameters and tables.

The facsimile function includes a transmission function, which includes an abbreviated number designation function and a timer-transmission function, or programmed transmission function. The abbreviated number designation function allows the user to designate an abbreviated number instead of the facsimile number of a desired destination when the facsimile transmission is made. When the user designates an abbreviated number, the facsimile number corresponding to the abbreviated number and stored in a facsimile number list 25a is retrieved and set as the facsimile number to be used. According to the embodiment, the user can designate a time at which the facsimile transmission is to be made when the user designates the abbreviated number for the destination.

The MFP 1 according to the embodiment is configured such that, when the facsimile number is busy, or when the timer-transmission is designated with the abbreviate number, a CRC (Cyclic Redundancy Check) operation is applied to the facsimile number, and an ICV (Integrity Check Value) obtained by the CRC operation is stored in a timer-transmission memory 25c together with the abbreviated number. In the CRC operation, the facsimile number is represented by ASCII character train, and character code "0" or null character is added to form a 90-digit value. Then, the ninety-digit value is divided by a 33-bit prime number to obtain a 32-bit remainder, which is used as the ICV. For example, if the facsimile number is "1234567", the ASCII character train is "31323334353737". Then, the 90-digit value will be "31323334353637000 . . . 00h." This value is divided by the 33-bit prime number, and the remainder of the division is used as the ICV.

If it was detected that the facsimile number of the destination was busy and a predetermined waiting period has passed, or if the current time has reached the programmed time (when the timer-transmission is designated), the facsimile number is retrieved from the facsimile number list 25a based on the abbreviated number. Then, the CRC operation is applied to the retrieved facsimile number to obtain the ICV. The currently obtained ICV is compared with the previously obtained ICV which has been stored in the timer-transmission memory 25c. If the two ICVs coincide with each other, the facsimile number corresponding to the abbreviated number has not been changed. Therefore, the facsimile transmission to the facsimile number is performed. If the two ICVs do not coincide, the facsimile number corresponding to the abbreviated number has been changed. In such a case, the programmed facsimile transmission is aborted.

The RAM 24 contains a temporary area 24a for temporarily storing variables and parameters necessary for executing various processes.

The flash memory 25 is a non-volatile rewritable memory which stores various settings, and provided with the above-described facsimile number list 25a, a group destination list 25b, and the timer-transmission memory 25c. The facsimile number list 25a and the group destination list 25b will be described lather, referring to FIGS. 3A and 3B.

In the time-transmission memory 25c, if the abbreviated number stored in the facsimile number list 25a is designated, the CRC operation is applied to the facsimile number corresponding to the designated abbreviate number to obtain the ICV, the abbreviated number, ICV and the programmed time are stored.

If a group number stored in the group destination list 25b is designated as the destination, a plurality of abbreviated numbers corresponding to the designated group number are retrieved from the group destination list 25b. Then, for each of the retrieved abbreviated numbers, a corresponding facsimile number is retrieved from the facsimile number list 25a, and the CRC operation is applied to obtain the ICV. Then, the group number, and retrieved abbreviated numbers, ICVs corresponding to the abbreviated numbers, and a programmed time are stored in the timer-transmission memory 25c.

It should be noted that the MFP 1 is configured such that, if a transmission time is not set, the time at which the destination is set is stored as the programmed transmission time, and the facsimile transmission is started immediately. If the transmission time is programmed, the transmission is started when the current time reaches the programmed time.

The scanner section 3 scans an image formed on an original sheet placed on a original table 6 under control of the CPU 22, and generate image data thereof. The image data thus generated is transmitted by facsimile to the destination corresponding to the facsimile number if the MFP 1 operates in the facsimile mode. Specifically, the image data is transmitted via MODEM 33, line control unit 34 and public telephone network 100, to the destination. If the MFP 1 operates in a copier mode, the image data generated by the scanner section 3 is printed out on the printing sheet by the printer section 2.

As mentioned above, the printer section 2 includes the inkjet printer which print images on the printing sheet under control of the CPU 22. Since the configuration of the inkjet printer is well-known, description thereof is omitted for brevity.

When the MFP 1 operates in the facsimile mode and is set to print out facsimile data received from another station via the public telephone network 100, line control unit 34 and the MODEM 33, image data is generated based on the received facsimile data, and is printed out by the printer section 2 on the printing sheet.

The MODEM 33 is configured to modulate the image data generated by the scanner section 2 for transmission through the line control unit 34, and to demodulate the signal received through the line control unit 34.

The line control unit 34 is used for receiving/outputting signals from/to the public telephone network 100. Under control of CPU 22, the line control unit 34 sets a signal transmission path to/from the telephone network 100. As the transmission path, when the operation unit 40 is operated to transmit images (i.e., for transmitting facsimile data), or when the image signal is received from the public telephone network 100 (i.e., when the facsimile data is received), a path directed to the MODEM 33 is set. Then, the MFP 1 operates such that the image signals can be sent/received through the thus set transmission path. It should be noted that when transmission of the image signals via the MODEM 33, or reception of the image signal from the public telephone network 100 has been finished, the transmission path is released, and the image signal cannot be transmitted.

FIG. 3A shows a data structure of the facsimile number list 25a stored in the flash memory 25. As shown in FIG. 3A, the facsimile number list 25a includes, for each 3-digit abbreviated number, corresponding destination name, facsimile number and mode are stored. When the user designates one 3-digit abbreviated number, the facsimile number and the mode corresponding to the designated abbreviated number are retrieved from the facsimile number list 25a. Then, to the station having the retrieved facsimile number, the facsimile transmission is sent in the mode defined by the facsimile number list 25a. The facsimile number is generally a 10-digit number in Japan. In foreign countries, the facsimile number may have more number of digits. If extension numbers are included, the facsimile number has more number of digits.

FIG. 3B shows an example of data structure of the group destination list 25b. The group destination list 25b is configured such that, as show in FIG. 3B, a plurality of abbreviated numbers are stored for each group number. The group number is represented by a symbol "#" followed by 3-digit number. When the user designates a group number, all the abbreviated numbers corresponding to the designated group number are designated. Then, the facsimile numbers corresponding to the designated abbreviated numbers are sequentially retrieved from the facsimile number list 25a, and the facsimile transmission is performed for the sequentially to the retrieved facsimile numbers, respectively.

By key operation of the operation unit 40, the facsimile number list 25a and the group destination list 25b can be edited. It should be noted that the edition of the facsimile number list 25a and the group destination list 25b can be done by the server 50 and PC 60 via the LAN 200.

FIG. 4 shows an message displayed on the LCD 41 when the facsimile transmission is aborted since the facsimile number corresponding to the abbreviated number has been changed. As described above, after the abbreviated number was designated and before the facsimile transmission is performed by retrieving the facsimile number corresponding to the abbreviated number, if the facsimile number corresponding to the abbreviated number has been changed, the facsimile transmission to the facsimile number corresponding to the abbreviated number is aborted. In such a case, a message as shown in FIG. 4 is displayed on the LCD 41. In this example, the message indicates that the transmission is aborted, and the abbreviated number corresponding to the aborted transmission are displayed. This massage may be displayed when the abortion of the transmission is determined, or in response to a confirming operation by the user.

FIG. 5 shows an example of a report indicating the termination of the transmission, which is printed out by the printing section 2. In this example, the abbreviated number corresponding to the aborted transmission, date and time when the report is printed are indicated. It should be appreciated that items to be printed on the report may be modified in various ways. In this report shown in FIG. 5, the termination of transmission is indicated by character string "NOT TX DUE TO CHANGE OF NUMBER."

Figure 6:
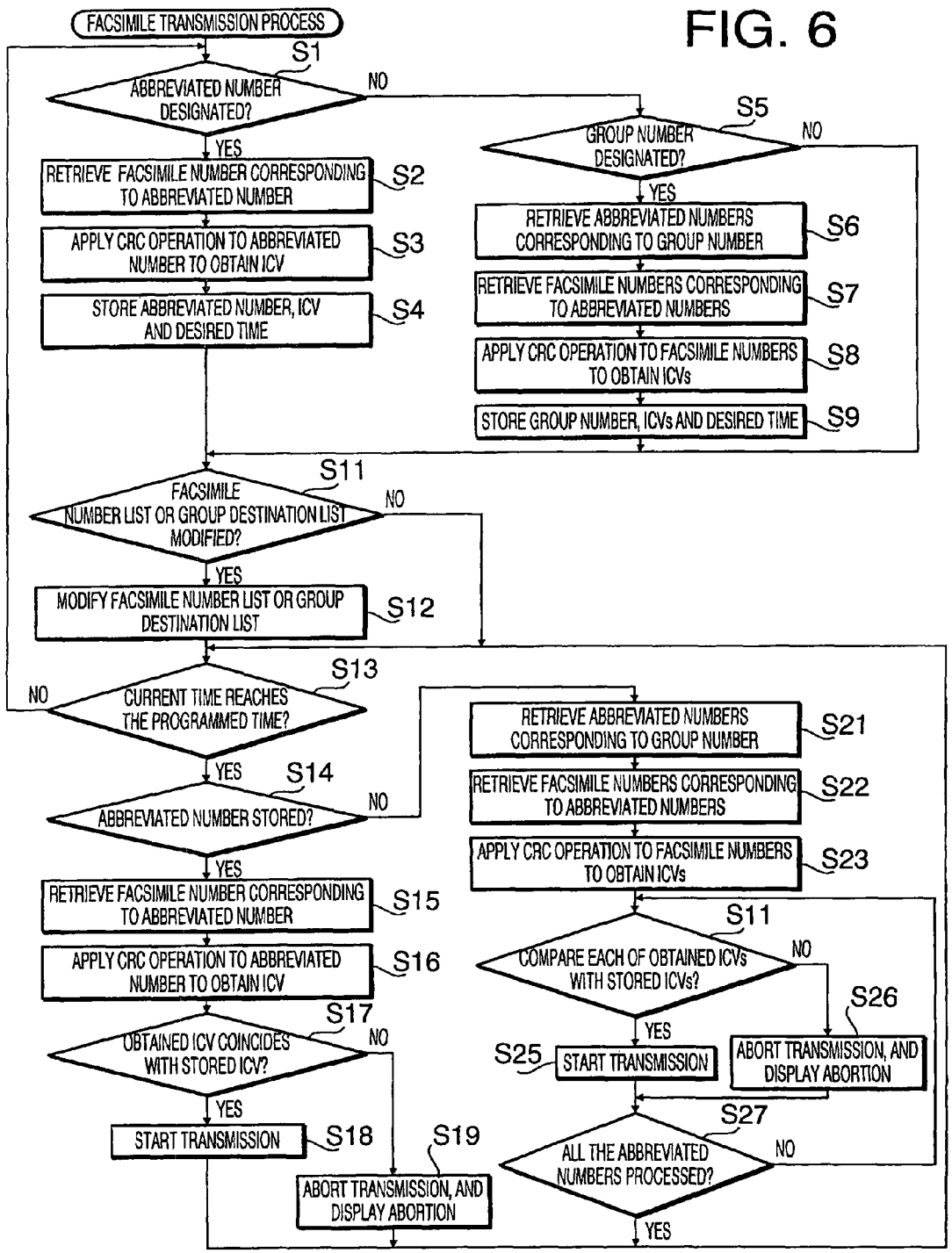
FIG. 6 is a flowchart illustrating a facsimile transmission process according to an embodiment.

FIG. 6 is a flowchart illustrating a facsimile transmission process which is a part of the facsimile function executed by the CPU 22. The facsimile transmission process is started when the MFP 1 is powered on. It should be noted that the printer function, scanner function, copier function, and the facsimile function other than the facsimile transmission process are well-known functions and not related to the characteristic feature of the invention, description thereof will be omitted for brevity.

When the facsimile transmission process is started, the process judges whether an abbreviated number is designated through the operation unit 40 (S1). If the abbreviated number is designated (S1: YES), the process retrieves the facsimile number corresponding to the designated abbreviated number from the facsimile number list 25a (S2). Then, the process applies the CRC operation to the retrieved facsimile number to obtain the ICV (S3). Next, in relation to the data to be transmitted, the abbreviated number, the ICV and the programmed time are stored in the timer-transmission memory 25c (S4). The data to be transmitted will be preliminary read through the scanner section 3, or received form the PC 60. The time at which the transmission is to be made (i.e., the programmed time) may be input through the operation unit 40 when, for example, the abbreviated number is designated. If the programmed time is not input, the process immediately starts the facsimile transmission.

If the abbreviated number is not input (S1: NO), the process judges whether a group number is input (S5). If the group number has been set (S5: YES), the process retrieves a plurality of abbreviated numbers corresponding to the input group number from the group destination list 25b (S6). Next, the process retrieves the facsimile numbers respectively corresponding to the plurality of abbreviated numbers from the facsimile number list 25a (S7). To each of the retrieved facsimile numbers, the CRC operation is applied to obtain the ICV (S8). Then, the process stores the thus obtained plurality of ICVs and designated group numbers in the timer-transmission memory 25c in relation to the transmission data together with the programmed time (S9).

After execution of step S4 or S9, or when the process judges that the group number is not designated (S5: NO), the process judges whether an operation to edit the facsimile number list 25a or group destination list 25b is performed (S11). It should be noted that the operation to edit the facsimile number list 25a or the group destination list 25b may be executed through the operation panel 4, or by an external device through the LAN 200. If such an operation is done (S11: YES), the process modifies the facsimile number list 25a or the group destination list 25b in accordance with the operation (S12). When the facsimile number list 25a is edited, a facsimile number corresponding to a certain abbreviated number may be changed, or deleted. If the facsimile number corresponding to an abbreviated number is deleted, a predetermined number (e.g., "00000000") may replace the originally stored facsimile number. When the group destination list 25b is modified, the abbreviated numbers corresponding to each group number may be modified, added or deleted.

When step S12 has been finished, or no operation for editing the facsimile number list 25a or group destination list 25b has been performed (S11: NO), the process judges whether the current time has reached each of the programmed times stored in the time-transmission memory 25c (S13). If the current time has not reached any one of the programmed times (S13: NO), the process returns to S1 and the above-described steps are performed. If the current time has reached at least one of the programmed times (S13: YES), the process judges whether the number stored in the timer-transmission memory 25c corresponding to the programmed time is an abbreviated number (S14). If the stored number is the abbreviated number (S14: YES), the process retrieves the facsimile number stored in the facsimile number list (S15). Next, the process applies the CRC operation to the retrieved facsimile number to obtain the ICV (S16). In S17, the process compares the ICV obtained in S16 with the ICV stored in the timer-transmission memory 25c. If both ICVs coincide with each other (S17: YES), the process determines that the facsimile number is the correct number (i.e., the facsimile number has not been changed) and starts the facsimile transmission to the facsimile number (S18). If the facsimile transmission is started, data regarding the executed programmed transmission stored in the timer-transmission memory 25b is deleted.

If the two ICVs do not coincide with each other (S17: NO), the process determines that the facsimile number is not a correct number (i.e., the facsimile number has been changed), and the facsimile transmission regarding the abbreviated number in question is aborted (S19). In this case, the indication shown in FIG. 4 is displayed on the LCD 41, and the transmission abortion report as shown in FIG. 5 is printed out by the printer section 2. After execution of S18, or when S19 is finished, the process returns to S13.

If the number stored in the timer-transmission memory 25c is not the abbreviated number (S14: NO), then the number represents the group number, and the process retrieves, from the group destination list 25b, a plurality of abbreviated numbers corresponding to the group number stored in the timer-transmission memory 25c (S21). Next, the process retrieves the facsimile numbers respectively corresponding to the plurality of abbreviated numbers from the facsimile number memory 25a (S22). Then, the process applies the CRC operation to the facsimile numbers to obtain the ICVs (S23), respectively.

Next, the process judges whether each of the ICVs obtained in S23 coincides with one of the ICVs stored in the timer-transmission memory 25c (S24). If an ICV coincides with one of the ICVs stored in the timer-transmission memory 25c, the process treated the facsimile number corresponding to the ICV is a correct number, and proceeds to start the facsimile transmission to the facsimile number (S25). If an ICV does not coincide with any one of the ICVs stored in the timer-transmission memory 25c, the process determines that the facsimile number corresponding to the ICV is a wrong number and abort the facsimile transmission. In this case, the process displays the indication as shown in FIG. 4, and prints out the report as shown in FIG. 5 (S26). After execution of S25 or S26, the process judges whether there remains unprocessed abbreviated number of the currently processed group (S27). If there remains an unprocessed number (S27: NO), the process returns to S24. If all the abbreviated numbers have been processed (S27: YES), and the process returns to S13.

As described above, according to the embodiment, when a programmed transmission is performed, the CRC operation is performed and the ICV is obtained at the time when the programming is input, which is stored together with the abbreviated number. Then, when the transmission is to be executed at the programmed time, the CRC operation is executed again to a facsimile number corresponding to the abbreviated number to obtain the ICV at this stage. If the two ICVs are identical, the two facsimile numbers can be considered the same, and the transmission is performed as scheduled. If the two ICVs are different from each other, the two facsimile numbers are different, and therefore, the transmission will not be performed. Since the number of digits of the ICV is much smaller than the corresponding facsimile number, even if the ICV is stored together with the abbreviated number, it is likely that there is a sufficient area in a memory (e.g., the flash memory) to store the ICVs. Thus, the transmission to a wrong destination due to change of the facsimile number corresponding to the abbreviated number can be prevented without much increasing the capacity of the memory. Further, since the abbreviated numbers are stored for the programmed transmissions, the memory can be used efficiently.

It should be noted that the invention can be modified in various ways without departing from the scope of the invention.

For example, in the above-described illustrative embodiment, the MFP 1 is referred to as an embodiment according to the invention. The invention can be applied to a single function device (e.g., the facsimile device).

In the above described illustrative embodiment, the CRC operation is introduced. In view of certainty, it is preferable to use a so-called CRC32 which generate a remainder of 32 bits (4 bytes) is used. However, although the degree of certainty is slightly lowered, it is still possible to employ CRC16 which provides with a remainder of 16 bits (2 bytes). In this case, the area for storing the ICV is further reduced.

In the illustrative embodiment, the facsimile number list and/or the group destination list can be edited by external devices (e.g., the server 50 or the PC 60) via the LAN 200. This configuration can be modified such that the edition can be performed another device via wireless connection (e.g., a cordless handset of the facsimile device).

What is claimed is:

1. A communication device capable of transmitting subject data to be transmitted, comprising:
    a facsimile number list storage configured to store a facsimile number list containing abbreviated numbers and respectively corresponding facsimile numbers;
    a destination designating unit configured to designate a desired destination by designating a desired abbreviated number stored in the facsimile number list storage;
    a first operating unit configured to apply a predetermined calculation to a facsimile number corresponding to the desired abbreviated number to obtain a first operated value;
    a designated transmission storage configured to store the desired abbreviated number and the first operated value;
    a transmission instruction unit configured to instruct the communication device to start transmitting the subject data;
    a second operating unit configured to apply the predetermined calculation to a facsimile number corresponding to the desired abbreviated number stored in the designated transmission storage to obtain a second operated value after the transmission instruction unit instructs to start transmitting the subject data;
    a judging unit configured to judge whether the first operated value coincides with the second operated value; and
    a controlling unit configured to automatically control the communication device to abort transmission of the subject data when the judging unit judges that the first operated value does not coincide with the second operated value.

2. The communication device according to claim 1, further comprising a modifying unit configured to modify the facsimile number list.

3. The communication device according to claim 2, wherein the modifying unit includes an external device connectable to the communication device.

4. The communication device according to claim 3, wherein the external device is connected to the communication device via a network.

5. The communication device according to claim 1,
    wherein the destination designation unit is configured to designate a desired time at which the subject data is to be transmitted, and
    wherein the transmission instruction unit is configured to instruct the communication device to start transmitting the subject data when a current time reaches the desired time.

6. The communication device according to claim 1, wherein each of the first operating unit and the second operating unit applies a CRC operation to the facsimile number and obtains an ICV.

7. The communication device according to claim 1, further comprising a group destination list storage configured to store a group destination list containing group numbers and a plurality of abbreviated numbers corresponding to each of the group numbers;
    wherein the destination designating unit is configured to designate a desired group number from among the group numbers stored in the group destination list storage,
    wherein the first operating unit is configured to apply the predetermined operation to each of the facsimile numbers corresponding to the abbreviated numbers that corresponds to the desired group number to obtain the first operated values respectively corresponding to the abbreviated numbers that correspond to the desired group number,
    wherein the designated transmission storage is configured to store the desired group number and the first operated values respectively corresponding to the abbreviated numbers that correspond to the desired group number,
    wherein the second operating unit is configured to apply the predetermined calculation to each of the facsimile numbers corresponding to abbreviated numbers that corresponds to the desired group number stored in the designated transmission storage to obtain the second operated values respectively corresponding, to the abbreviated numbers that correspond to the desired group number after the transmission instruction unit instructs to start transmitting the subject data,
    wherein the judging unit is configured to judge whether each of the second operated values coincides with one of the first operated values, and
    wherein the controlling unit is configured to control the communication device to transmit the subject data to the facsimile numbers corresponding to the abbreviated numbers of which the first operated values coincide with the second operated values, respectively, while the controlling unit controls the communication device to abort transmission of the subject data to the facsimile numbers corresponding to the abbreviated numbers of which the first operated values do not coincide with the second operated values, respectively.

8. The communication device according to claim 7,
    wherein the destination designating unit is configured to designate a desired time at which the subject data is to be transmitted, and
    wherein the transmission instruction unit is configured to instruct the communication device to start transmitting the subject data when a current time reaches the desired time.

9. The communication device according to claim 7, wherein each of the first operating unit and the second operating unit is configured to apply a CRC operation to the facsimile number and obtains an ICV.

10. The communication device according to claim 1, further comprising a display unit configured to display a predetermined indication notifying abortion of the transmission of the subject data.

11. The communication device according to claim 1, further comprising a printing unit configured to print out a predetermined message notifying abortion of the transmission of the subject data.

12. A method of transmitting subject data to be transmitted for a communication device, comprising the steps of:
  designating a desired destination by designating a desired abbreviated number contained in a facsimile number list containing abbreviated numbers and respectively corresponding facsimile numbers;
  first applying a predetermined calculation to a facsimile number corresponding to the desired abbreviated number to obtain a first operated value;
  storing the desired abbreviated number and the first operated value;
  acquiring a transmission instruction to start transmitting the subject data;
  second applying the predetermined calculation to a facsimile number corresponding to the desired abbreviated number stored in the storing step to obtain a second operated value after the transmission instruction is acquired;
  judging whether the first operated value coincides with the second operated value; and
  automatically aborting transmission of the subject data when the first operated value does not coincide with the second operated value.

13. The method according to claim 12, wherein the predetermined operation includes a CRC operation and each of the first operated value and second operated value are ICVs.

14. The method according to claim 12,
  wherein the destination designating step designates a desired group number from among the group numbers stored in the group destination list containing group numbers and a plurality of abbreviated numbers corresponding to each of the group numbers,
  wherein the first applying step applies the predetermined calculation to each of the facsimile numbers corresponding to the abbreviated numbers that corresponds to the desired group number to obtain the first operated values respectively corresponding to the abbreviated numbers that correspond to the desired group number,
  wherein the storing step stores the desired group number and the first operated values respectively corresponding to the abbreviated numbers that correspond to the desired group number,
  wherein the second applying step applies the predetermined calculation to each of the facsimile numbers corresponding to the abbreviated numbers that corresponds to the desired group number stored in the storing step to obtain the second operated values respectively corresponding to the abbreviated numbers that correspond to the desired group number after the acquiring step acquires the instruction to start transmitting the subject data,
  wherein the judging step judges whether each of the second operated values coincides with one of the first operated values, and
  wherein the aborting step controls the communication device to transmit the subject data to the facsimile numbers corresponding to the abbreviated numbers of which the first operated values coincide with the second operated values, respectively, while the aborting step controls the communication device to automatically abort transmission of the subject data to the facsimile numbers corresponding to the abbreviated numbers of which the first operated values do not coincide with the second operated values, respectively.

15. The method according to claim 14, wherein the predetermined calculation includes a CRC operation and each of the first operated value and second operated value are ICVs.

16. The method according to claim 12, further comprising the step of notifying abortion of the transmission of the subject data to a user.

17. A non-transitory computer readable medium having computer readable instruction stored thereon, which, when executed by a processor or a communication device capable of transmitting subject data, configures the processor to perform the steps of:
  designating a desired destination by designating a desired abbreviated number contained in a facsimile number list containing abbreviated numbers and respectively corresponding facsimile numbers;
  first applying a predetermined calculation to a facsimile number corresponding to the desired abbreviated number to obtain a first operated value;
  storing the desired abbreviated number and the first operated value;
  acquiring a transmission instruction to start transmitting the subject data;
  second applying the predetermined calculation to a facsimile number corresponding to the desired abbreviated number stored in the storing step to obtain a second operated value after the transmission instruction is acquired;
  judging whether the first operated value coincides with the second operated value; and
  automatically aborting transmission of the subject data when the first operated value does not coincide with the second operated value.

18. The recording medium according to claim 17, wherein the predetermined calculation includes a CRC operation and each of the first operated value and second operated value are ICVs.

19. The recording medium according to claim 17,
  wherein the destination designating step designates a desired group number from among the group numbers stored in the group destination list containing group numbers and a plurality of abbreviated numbers corresponding to each of the group numbers,
  wherein the first applying step applies the predetermined calculation to each of the facsimile numbers corresponding to the abbreviated numbers that corresponds to the desired group number to obtain the first operated values respectively corresponding to the abbreviated numbers that correspond to the desired group number,
  wherein the storing step stores the desired group number and the first operated values respectively corresponding to the abbreviated numbers that correspond to the desired group number,
  wherein the second applying step applies the predetermined calculation to each of the facsimile numbers corresponding to the abbreviated numbers that corresponds to the desired group number stored in the storing step to obtain the second operated values respectively corresponding to the abbreviated numbers that correspond to the desired group number after the acquiring step acquires the instruction to start transmitting the subject data, wherein the judging step judges whether each of the second operated values coincides with one of the first operated numbers, and wherein the aborting step controls the communication device to transmit the subject data to the facsimile numbers corresponding to the abbreviated numbers of which the first operated values coincide with the second operated values, respectively, while the aborting step controls the communication device to automatically abort transmission of the subject data to the facsimile numbers corresponding to the abbreviated numbers of which the first operated values do not coincide with the second operated values, respectively.

20. The recording medium according to claim 19, wherein the predetermined calculation includes a CRC operation and each of the first operated value and second operated value are ICVs.

* * * * *